Feb. 24, 1970  E. M. MOFFATT  3,496,771
MASS FLOW MEASURING DEVICE FOR A GASEOUS MEDIUM
Filed March 4, 1968
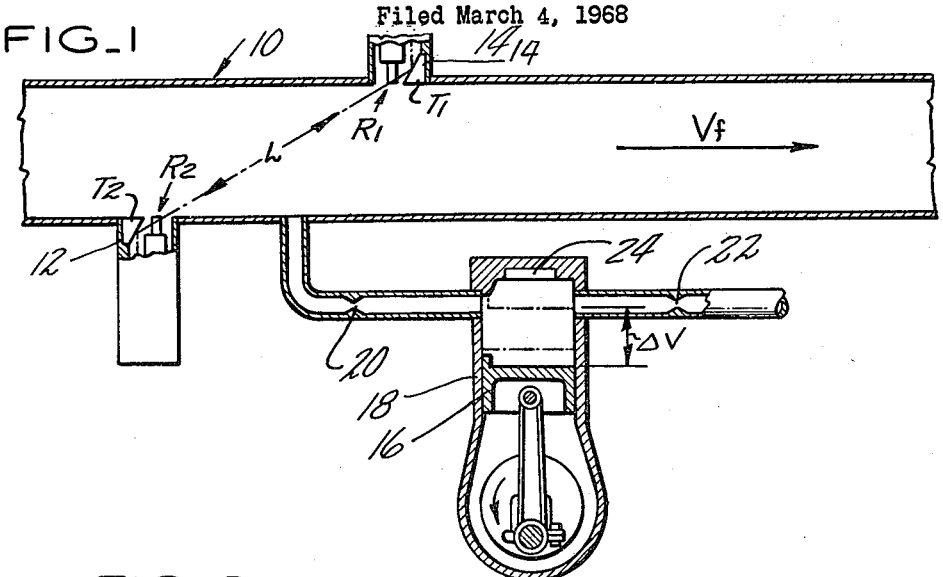
FIG_1
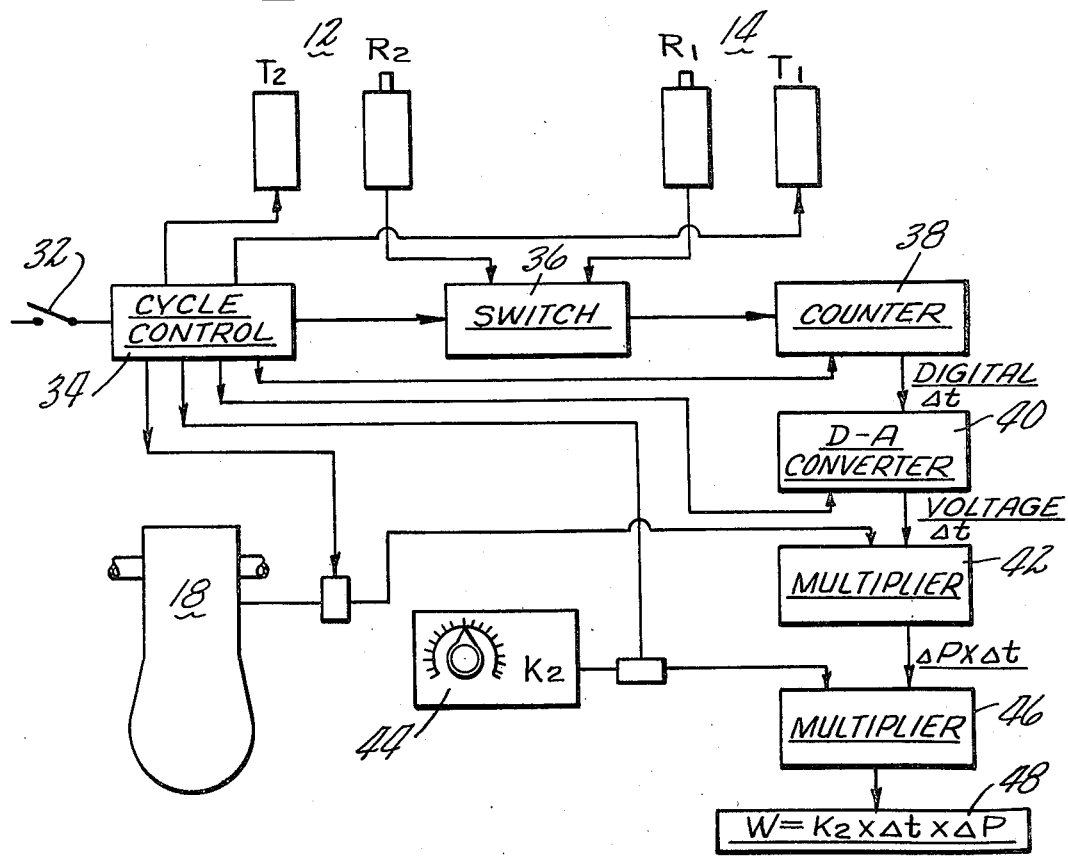
FIG_2
INVENTOR
E. MARSTON MOFFATT
BY John C. Lindeman
AGENT

United States Patent Office 3,496,771
Patented Feb. 24, 1970

3,496,771
MASS FLOW MEASURING DEVICE FOR A GASEOUS MEDIUM
Elbert Marston Moffatt, Glastonbury, Conn., assignor to United Aircraft Corporation, East Hartford, Conn., a corporation of Delaware
Filed Mar. 4, 1968, Ser. No. 710,278
Int. Cl. G01p 5/00
U.S. Cl. 73—194                                6 Claims

ABSTRACT OF THE DISCLOSURE

A device for measuring mass flow of a gaseous medium in a duct is provided wherein an easily sensed compressibility factor of the gas is automatically measured and incorporated with a flow velocity parameter to produce the mass flow indication.

Background of the invention

In the field of gas pumping by large gas producing utilities it is very important to have an accurate knowledge of the mass flow of the gas being pumped through the pipe lines because the user is charged according to the B.t.u. content of the gas supplied. To date, devices for providing this information have involved a direct flow measurement which is combined with an estimate of the average density. The density must be estimated manually based upon periodic measurements. As a result, the indication of total daily gas purchase or consumption contains inaccuracies.

Summary of invention

Accordingly it is an object of this invention to provide an automatic gaseous medium mass flow measuring device by automatically sensing a flow velocity parameter and an easily sensed compressibility factor of the gas.

The foregoing and other objects, features and advantages of the present invention will become more apparent in the light of the following detailed description of preferred embodiments thereof as illustrated in the accompanying drawings.

Brief description of the drawings

FIGURE 1 illustrates a preferred embodiment of the automatic gaseous medium mass flow measuring device of this invention.

FIGURE 2 illustrates the operation of the devices 12, 14 and the sensor 18 shown in FIGURE 1.

Description of the preferred embodiment

In FIGURE 1 a pipeline 10 contains a gaseous medium flowing in the direction as indicated and it is desred to know the mass flow of the gas therein. The mass flow measuring device utilizes two parameter-measuring devices, i.e., a sonic wave measuring device for providing a signal indicative of the flow velocity and a cylinder and piston device for providing an indication of the compressibility of the gaseous medium.

The sonic flow measuring device sends a pulse both downstream and upstream in the pipe and the time for the pulses to reach their respective receiving devices may be utilized to indicate the flow rate of the gas. The flow measuring device comprises two pairs of transmitting and receiving devices 12 and 14, separated by a distance L. The $T_2$ transmitter represents a sonic pulse source which sends a pulse downstream towards the receiver $R_1$ and similarly the transmitter $T_1$ sends a pulse upstream to the receiver $R_2$. In view of the directional flow the ($T_1$-$R_2$) transmitter-receiver combination measures the time to send a pulse upstream and the $T_2$-$R_1$ combination measures the time to send a pulse downstream. The difference in time that it takes for these pulses to travel through the gaseous medium is a parameter of the flow velocity. The sonic pulse producing device may be such as described in my copending application entitled "Shock Pulse Generator," U.S. Ser. No. 631,009, filed Apr. 14, 1967. The receiving devices, i.e., the pickups, may be damped quartz piezoelectric crystals of the type shown and described in my copending applications entitled "Acoustic Wave Sensor," U.S. Ser. No. 606,275, filed Dec. 30, 1966 and "Gas Flow Measuring System," U.S. Ser. No. 654,786, filed July 20, 1967.

The density sensor comprises a piston 16 which reciprocates through a known displacement, $\Delta V$ in a compression chamber cylinder 18 of known volume. The cylinder 18 is connected to the pipeline through a restriction 20 and is bled to atmosphere through a smaller restriction 22. This small bleed 22 is to insure ample flow of gas through the cylinder 18 so that the mean pressure and temperature in the cylinder will be equal to the pipe pressure to within a tenth of a percent. The restriction 20 has to be sized in relation to piston speed and it must offer sufficient restriction to allow the piston pressure to follow the adiabatic relationship within a tenth of a percent. As the piston 16 reciprocates, it will pump some gas back and forth through the restriction 20 but this flow can be less than a tenth of a percent of the cylinder volume and may be considered negligible. The error of $\frac{1}{10}$ percent is used as a typical figure for precision measurement. This accuracy can be improved at the expense of retarding the speed of the response of the system by changing the relative size of the restrictions. Common one-way flow valve arrangements for obtaining this result may also be used.

At the top of the cylinder 18 is a pressure transducing device 24 which may be a piezoelectric dynamic pressure sensor. The sensor is insensitive to static pressure such as that in the pipeline 10, but produces an A.C. voltage output representing the peak-to-peak pressure variation, $\Delta P$, in the cylinder as its gas is compressed by the piston 16. The dynamic pressure sensor eliminates the need for high response static pressure sensors and subtraction networks to obtain the pressure variation value, $\Delta P$. The A.C. voltage is directly proportional to the quantity $\Delta P$.

The stream velocity in the center of the pipe is $V_f$ and the sound velocity may be described as $V_s$. The two quartz receivers, $R_1$ and $R_2$, are located at a distance L respectively up- and downstream from one another and detect the time intervals $t_1$ and $t_2$, indicative of the times necessary for the sonic pulses to travel the distance L in the up- and downstream directions.

Then:
$t_1$=time for the sonic signal to travel upstream $$Lft=\frac{L}{V_s-V_f}$$

$t_2$=time for the sonic signal to travel downstream $$Lft=\frac{L}{V_s+V_f}$$

(1) $$t_1-t_2=\frac{L}{V_s-V_f}-\frac{L}{V_s+V_f}=\frac{2LV_f}{V_s^2\left[1-\frac{V_f^2}{V_s^2}\right]}$$

Under actual circumstances the gas flow $V_f$ through the pipe is substantially less than $V_s$, the velocity of sound, so that (2) $$t_1-t_2=\frac{2LV_f}{V_s^2}$$

to a very close approximation.

For an imperfect gas of unknown composition (3) $$V_s^2 = \frac{K_3 g}{\gamma}$$

where $K_3$ is an adiabatic compressibility factor and equals $$\frac{\Delta P}{\frac{\Delta V}{V}}$$

i.e., the incremental change is pressure $\Delta P$ for a percentage change in the volume $\Delta V/V$. The quantity $\gamma$ equals the density of the gas and $g$ is the gravity constant. Hence, (4) $$V_s^2 = \frac{\Delta P}{\Delta V/V} \cdot g \cdot \frac{1}{\gamma}$$

and substituting Equation 4 in 2 yields (5) $$t_1 - t_2 = \frac{2LV_f \gamma}{\frac{\Delta P}{\Delta V/V} \cdot g}$$

solving for $V_f$ yields (6) $$V_f = \frac{(t_1 - t_2) \cdot g \cdot \frac{\Delta P}{\Delta V/V}}{2L\gamma}$$

The weight flow, W, in pounds per second of the gas through a pipe equals (7) $$W = V_f K_1 A \gamma$$

where A is the duct cross section of the pipe, and $K_1$ is the constant to correct for the velocity profile of the gas in the pipe.

Substituting (6) and (7) yields (8) $$W = \left[\frac{K_1 A g}{2L \frac{\Delta V}{V}}\right](t_1 - t_2)(\Delta P)$$

$$\frac{K_1 A g}{2L \frac{\Delta V}{V}}$$

is a constant $K_2$ for the system for any gas, and $(t_1 - t_2)$ and $\Delta P$ are easily measured variables.

For an imperfect gas the compressibility factor can be measured directly by feeding a sample into a reciprocating compressor chamber with a volumetric change $\Delta V$ (displacement) and a mean volume (V), and measuring the resulting pressure fluctuation $\Delta P$ with a pressure transducer such as a piezoelectric type.

The use of such a compressibility factor measuring device in conjunction with the measured time $(t_1 - t_2)$ will then yield an automatic mass flow measuring apparatus for a gas of any mixture and unknown composition by applying Equation 8.

Equation 8 can be written:

(9) $$W = K_2 \cdot \Delta t \cdot \Delta P$$

where $$K_2 = \left[\frac{K_1 A g}{2L \frac{\Delta V}{V}}\right]$$

and is constant for any given system, depending only on the geometry. The two variable parameters are easily measured and account for density, temperature and other factors which are normally required in mass flow measurements. Since the formula is generally applicable to all gases, the system is particularly suited to pipeline installations where gas compositions may vary from time to time.

FIGURE 2 illustrates how the devices 12 and 14, and compressibility sensor 18 can give continuous automatic readout of weight flow of gas.

When power switch 32 is closed, an automatic cycle control 34 is actuated and performs the following sequence:

(1) A counter 38 is switched by means of a switch 36 to a COUNT-UP mode. The $R_1$ output is switched to START COUNT and the $R_2$ output is switched to a STOP COUNT.

(2) $T_1$ is fired, giving a count on the counter equal to the upstream travel time for the pulse.

(3) The counter 38 is switched to a COUNT-DOWN mode, the $R_1$ output is switched to STOP COUNT and the $R_2$ output is switched to START COUNT.

(4) $T_2$ is fired, subtracting the time for the pulse to travel downstream from the previous count so that the time registered on the counter is now the differential time $\Delta t$.

(5) The counter reading is transferred to a standard D-A converter 40, e.g., a Foxboro 681 P-N Digital to Analog Converter.

(6) The voltage output from converter 40 is switched to a multiplier 42, e.g., an Applied Dynamics, Inc., Model 68 Quarter Square Multiplier, at the same time as the $\Delta P$ voltage from sensor 24.

(7) The output from multiplier 42 and a pre-set voltage from a voltage source 44, corresponding to $K_2$, are switched to another multiplier 46, of the same type as multiplier 42.

(8) The reading on a meter 48 is erased and the output from multiplier 46 is switched at $\Delta t$ to give the new value of W.

This sequence can be repeated as frequently as desired and accomplished automatically through the use of a timed cycle in cycle control 34.

Many other types of computing systems and read-outs could be used. For example, indicator 48 could be a simple voltmeter graduated in terms of W with a loading device to hold the previous reading until a new one is received. Indicator 48 could also be a digital voltmeter, the indicator could have a tape print-out or could integrate the totals automatically to give total flow over a period of time.

If the voltage $\Delta P$ is converted to digital form with an A-D converter, $\Delta P$, $\Delta t$, and $K_2$ can be multiplied automatically on a standard digital computer.

I claim:

1. A device for measuring mass flow of a gas in a duct comprising:
    (a) means for producing sonic waves which travel upstream and downstream in the gas flow through a section of the duct;
    (b) means for measuring the difference in the travel time of a sonic wave moving upstream in the section and travel time of a sonic wave moving downstream in the section;
    (c) means for measuring a compressibility factor of the gas flowing in the duct; and
    (d) multiplier means responsive to both measuring means for producing a signal proportional to the mass flow of the gas.

2. A device according to claim 1 wherein the means for measuring a compressibility factor measures an adiabatic compressibility factor and comprises:
    (a) a gas compressor having a compression chamber of known volume and displacement, the chamber having an intake coupled to the duct for drawing off gas and an exhaust; and
    (b) means for sensing the gas pressure in the compression chamber and producing a signal proportional to the peak-to-peak pressure variation in the chamber.

3. A device according to claim 2 wherein the gas compressor and the means for sensing the gas pressure measure an adiabatic compressibility factor equal to $$\frac{\Delta P}{\Delta V / V}$$

where:

ΔP is the peak-to-peak pressure variation in the chamber and

ΔV/V is a constant for the device in which ΔV is the known displacement of the compressor and V is the mean volume of the chamber.

4. A device according to claim 1 wherein:
(a) the means for producing sonic waves includes shock pulse generators positioned at each end of the duct section;
(b) the means for measuring the travel times includes sonic pulse receivers positioned at each end of the section and between the pulse generators; and
(c) subtracting means are connected with the pulse receivers for producing a signal proportional to the difference in travel times of an upstream-moving pulse and a downstream-moving pulse.

5. A device according to claim 4 for continuously measuring mass flow wherein:
(a) the subtracting means includes:
(1) a digital counter having COUNT-UP and COUNT-DOWN modes associated respectively with the upstream-moving pulse and downstream-moving pulse; and
(2) a digital-to-analog converter receiving the digital count; and
(b) the multiplier means includes a multiplier circuit having an input from the digital-to-analog converter proportional to the digital count, another input from the means for measuring the compressibility factor and an output proportional to the mass flow.

6. In the device adapted for determining the mass flow of a gas through a duct, the combination comprising:
(a) means for transmitting sonic waves in both upstream and downstream directions through a section of the duct;
(b) means for detecting the difference in travel time between an upstream travelling wave and a downstream travelling wave; and
(c) means for sensing an adiabatic compressibility factor for the gas, the sensing means including compressor means for compressing a known volume of the gas by a preselected amount and a pressure sensing means connected to the compressor means for sensing the change in the gas pressure.

References Cited
UNITED STATES PATENTS

| | | | |
|---|---|---|---|
| 2,911,825 | 11/1959 | Kritz | 73—194 |
| 2,911,826 | 11/1959 | Kritz | 73—194 |
| 3,083,569 | 4/1963 | Thomas et al. | 73—194 |
| 3,248,942 | 5/1966 | Cole | 73—231 |
| 3,388,597 | 6/1968 | Bargen et al. | 73—231 |

CHARLES A. RUEHL, Primary Examiner

U.S. Cl. X.R.

73—30